US012617252B2

(12) United States Patent     (10) Patent No.:   US 12,617,252 B2

Günter et al.     (45) Date of Patent:    May 5, 2026

(54) METHOD FOR SETTING AN AIR CONDITIONER

(71) Applicant: MAHLE INTERNATIONAL GMBH, Stuttgart (DE)

(72) Inventors: Marcel Günter, Stuttgart (DE); Marco Roth, Stuttgart (DE); Kristian Haase, Leinfelden-Echterdingen (DE); Lars Ludwig, Altbach (DE)

(*) Notice: Subject to any disclaimer, the term of this patent is extended or adjusted under 35 U.S.C. 154(b) by 30 days.

(21) Appl. No.: 18/753,122

(22) Filed: Jun. 25, 2024

(65) Prior Publication Data

US 2025/0001832 A1     Jan. 2, 2025

(30) Foreign Application Priority Data

Jun. 27, 2023    (DE) ......................... 102023206038.8

(51) Int. Cl.
   B60H 1/00        (2006.01)
   G05B 13/02      (2006.01)

(52) U.S. Cl.
   CPC ....... B60H 1/0073 (2019.05); G05B 13/0265 (2013.01)

(58) Field of Classification Search
   CPC .......................... B60H 1/0073; G05B 13/0265
   See application file for complete search history.

(56) References Cited

U.S. PATENT DOCUMENTS

| 10,642,256 | B2 | 5/2020 | Rocci et al. |
| 11,318,812 | B2 | 5/2022 | Saeki et al. |
| 11,957,489 | B2 | 4/2024 | Androulakis |
| 2020/0031195 | A1* | 1/2020 | Woods ............... B60H 1/00771 |
| 2020/0094651 | A1 | 3/2020 | Ostrowski et al. |
| 2021/0078382 | A1* | 3/2021 | Maeng ...................... A61B 5/01 |
| 2022/0388370 | A1* | 12/2022 | Pihlsgård ........... B60H 1/00742 |
| 2023/0122813 | A1 | 4/2023 | Ostrowski et al. |

FOREIGN PATENT DOCUMENTS

| DE | 112013003595 | 4/2015 |
| DE | 102014102827 | 9/2015 |
| DE | 102014016532 | 5/2016 |
| DE | 102015221416 | 5/2017 |
| DE | 102018113074 | 12/2018 |
| DE | 102018129417 | 5/2020 |
| DE | 102020107178 | 10/2020 |
| DE | 112019000315 | 10/2020 |
| DE | 102022127026 | 4/2023 |
| GB | 2592215 | 8/2021 |

OTHER PUBLICATIONS

English translation of Search Report issued in DE102023206036-1 (Feb. 14, 2024).

* cited by examiner

*Primary Examiner* — Naeem Taslim Alam

(74) *Attorney, Agent, or Firm* — Barnes & Thornburg

(57)            ABSTRACT

A method for individualized setting of an air conditioner in a vehicle for a user using a control architecture is provided. Data relating to setting the air conditioner is acquired for all users and all vehicles and an average basis model is trained in an AI unit using the data acquired for all users and all vehicles. A comfort model is then created in the AI unit from at least the basis model and individualized settings for the air conditioner for a specific user are predicted based on the comfort model.

A control architecture for executing the method is also provided.

10 Claims, 1 Drawing Sheet

METHOD FOR SETTING AN AIR CONDITIONER

CROSS-REFERENCE TO RELATED APPLICATIONS

This application claims priority from German Patent Application No. 10 2023 206 038.8, filed on Jun. 27, 2023, the entirety of which is hereby fully incorporated by reference herein.

The invention relates to a method for individualized setting of an air conditioner in a vehicle using a control architecture according to the preamble of claim 1. The invention also relates to the control architecture for executing the method.

An air conditioner user can set the temperature by changing numerous parameters based on the user's thermal perceptions. The air conditioner can be set by a climate control system based on an engine performance map, thus simplifying use of the air conditioner. The thermal perceptions of an individual user may be very specific, however. Conventional performance map-based climate controls are configured for "average" people, and cannot be automatically adjusted to individual users. If the user does not feel comfortable with performance map-based climate control, the air conditioner has to be adjusted manually.

AI-supported comfort models (AI: artificial intelligence) that can be adjusted to individual preferences have also been proposed. With these, the user's settings for the air conditioner are correlated with context data, e.g. exterior temperature or interior temperature, and used for training the comfort model. The trained comfort model can then predict the optimal settings of the air conditioner for individual users at predefined times from the context data. Unfortunately, the comfort model cannot be used for other users and other vehicles with this solution.

The object of the invention is to therefore create an improved, or at least alternative, method with which the above disadvantages are resolved. It is also the object of the invention to create a corresponding control architecture for executing the method.

This is achieved according to the invention by the subject matter of the dependent claims. Advantageous embodiments are the subject matter of the dependent claims.

The present invention is based on the general idea of creating the comfort model through a superimposing different models on one another, so that it can be used for different vehicles and different users.

The method is intended for individualized setting of an air conditioner in a vehicle for a user using a control architecture. Data relating to setting the air conditioner is acquired by the control architecture for all users and/or all vehicles, and an average basis model is trained with this data in an AI unit. A comfort model is then created in the AI unit from at least the basis model, and individualized settings for the air conditioner are then predicted for a specific user based on the comfort model.

The comfort model therefore contains at least the average basis model, which takes the data acquired for all users and all vehicles into account. The trained basis model can therefore be used to predict individualized settings for all users in all vehicles, or for specific users in specific vehicles. Accordingly, the comfort model based on the basis model can be used for any vehicle and/or any user. Consequently, the comfort model can reduce the amount of manual input from the user, and it can be used for any vehicle and/or any user with less difficulty. The basis model and comfort model can be based on data, which reduces the development difficulties significantly in comparison with performance map-based models. Alternatively, the basis model can also be obtained using a performance map-model.

Advantageously, the data acquired for all users and all vehicles can be sent to a cloud storage, and the average basis model can be trained with this data in the AI unit in the cloud. The comfort model can then also be created from at least the average basis model in the cloud. Consequently, the average basis model and/or a sub-model, described in greater detail below, can be trained in a central location using the data acquired for all users and all vehicles. The trained comfort model can then be sent from the cloud to a specific vehicle that contains the air conditioner that is to be set, and the individualized settings for the air conditioner for a specific user can be sent directly to the vehicle. Alternatively, the individualized settings for the air conditioner in a specific vehicle for a specific user can be determined in the cloud and then sent to the vehicle. The cloud is a network that provides computer resources such as servers, and/or data storage, and/or applications.

In the context of the present invention, vehicles are any vehicles that have air conditioners, regardless of their properties. The vehicles can be of different types, each type of which comprises numerous vehicles with identical properties. A specific vehicle may be classified as a specific type. These vehicles can be from a specific manufacturer, for example, or they can be specific models of vehicles from a specific manufacturer.

The data relating to setting the air conditioner can contain context data for the vehicle such as the interior temperature, and/or exterior temperature, and/or humidity, and/or position of the sun, and/or light intensity, and/or air pressure, and/or type of vehicle. The data relating to setting the air conditioner can also contain setting data entered by the user, such as the desired temperature, and/or fan settings, and/or heated seat settings, and/or heated surface settings, and/or heater settings. The data relating to setting the air conditioner can also contain user data that contains physiological user information for the user, e.g. the user's identity, and/or seat position, and/or skin temperature, and/or pulse rate, and/or respiratory rate, and/or age, and/or gender, and/or state of clothing, and/or emotional state, and/or biometric inputs, and/or physiological inputs. The data relating to setting the air conditioner can also contain optimization data for user-specific perceptions, e.g. "head too cold," "right leg too warm," or "fan is unpleasant."

In one advantageous embodiment of the method, at least one sub-model can also be trained or created in the AI unit. The comfort model can be created by superimposing the at least one sub-model on the basis model. The respective sub-model can be trained using all of the data acquired for all users and all vehicles, or using just part of the data acquired for all users and/or all vehicles. The respective sub-model can thus correct or adjust the average basis model to individualize certain aspects or parameters of the comfort model. In particular, the respective sub-model can adjust or individualize the comfort model based on the average basis model for a specific user, and/or a specific vehicle, and/or for a specific user of a specific vehicle.

Numerous sub-models can be trained or created in the AI unit, each of which reflects different aspects or parameters of the comfort model. Consequently, some data relating to setting the air conditioner can be ignored when training one sub-model, and used when training another sub-model. By way of example, the user data, and/or context data, and/or setting data, and/or optimization data can be partially or entirely ignored when training the sub-model. Thus, when training one sub-model, the user data or context data can be partially or entirely ignored, such that the sub-model is trained for a specific user or vehicle. As explained above, the respective sub-model can then adjust or individualize the comfort model based on the basis model for a specific user, and/or for a specific vehicle, and/or for a specific user of a specific vehicle.

The respective sub-model can be a variation of the basis model. In other words, the respective sub-model can determine the extent to which the comfort model differs from the basis model when an aspect or parameter taken into account by the sub-model is incorporated in the comfort model. The respective sub-model can be obtained with a performance map model.

The individualized settings for the air conditioner can contain values for the parameters that are to be set in the air conditioner, e.g. the target temperature and/or fan level, for an individualized setting of the air conditioner. The basis model can output, or contain, at least one absolute value for at least one associated parameter that is to be set for the air conditioner, e.g. a target temperature of 23.3° C. The respective sub-model can output or contain at least one differential value for an associated parameter that is to be set for the air conditioner, e.g. a change in the target temperature of –0.5° C.

The sub-model can be trained as a vehicle model with the control architecture. The vehicle model can be a model based on the data acquired for all users of a specific type of vehicle. The data acquired for all users of a specific type of vehicle, and therefore the properties of a specific type of vehicle, are taken into account in the vehicle model, independently of the user. The vehicle model can then be used to predict individualized settings for all users in a specific type of vehicle.

The sub-model can also be trained as a user model by the control architecture. The user model can be a model based on the data acquired for a specific user of numerous vehicles. The data acquired for a specific user of numerous vehicles, and therefore the preferences of a specific user, are taken into account in the trained user model, independently of the vehicles, or types of vehicles. The user model can therefore be used to predict individualized settings for a specific user in all vehicles.

The sub-model can also be trained as a user/vehicle model by the control architecture. The user/vehicle model can be a model based on the data acquired for a specific user of a specific type of vehicle. The data acquired for a specific user in a specific type of vehicle, and therefore the preferences of a specific user and the properties of a specific type of vehicle are taken into account in the trained user/vehicle model. The user/vehicle model can be used to predict the individualized settings for a specific user in a specific type of vehicle.

The vehicle model, and/or user model, and/or user/vehicle model can differ from one another. The individual sub-models take different portions of the acquired data into account, and therefore have different focuses and different applications. In particular, sub-models can relate to a specific user and/or specific type of vehicle.

The comfort model can be created by superimposing the vehicle model, and/or user model, and/or user/vehicle model on the basis model. The individualized settings for the air conditioner can then be predicted for a specific user at a high level of accuracy based on the comfort model obtained through this superimposing.

The invention also relates to a control architecture for executing the above method. The control architecture is designed to acquire data relating to setting the air conditioner for all users and all vehicles, train an average basis model based on the data acquired for all users and all vehicles in an AI unit, create a comfort model from at least the basis model in the AI unit, and predict individualized settings for the air conditioner for a specific user based on the comfort model. It is understood that the control architecture has all of the hardware and software necessary for executing the method. The hardware necessary for executing the method can be part of a cloud storage and/or part of the vehicle. To avoid repetition, reference is made to the above explanations.

Other important features and advantages of the invention can be derived from the dependent claims, the drawings, and the descriptions of the drawings.

It is understood that the features specified above and explained below can be used not only in the given combinations but also in other combinations or in and of themselves, without abandoning the framework of the present invention.

Preferred exemplary embodiments of the invention are shown in the drawings, and shall be explained below in greater detail, in which the same reference symbols are used for the same, similar, or functionally identical components.

Therein, schematically:

Figure 1:
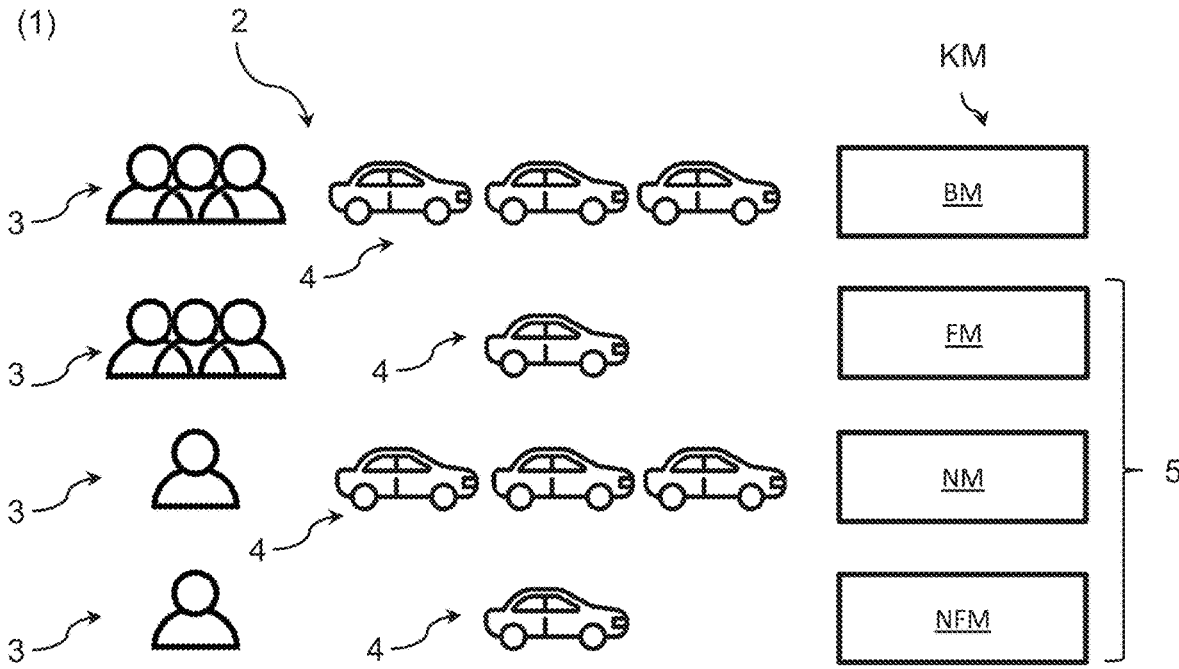
FIG. 1 shows a data structure in the method according to the invention.

FIG. 1 shows a data structure in the method 1 according to the invention. Data 2 relating to setting the air conditioner is acquired for all users 3 and vehicles 4 in the method 1. A basis model BM and sub-model 5 are trained in an AI unit based on the acquired data 2. The trained sub-models 5 are a vehicle model FM, user model NM, and user/vehicle model NFM in this exemplary embodiment. A comfort model KM can then be created by superimposing the vehicle model FM, and/or user model NM, and/or user/vehicle model NFM on the basis model BM.

The basis model BM is an average model that is trained or created with the data 2 acquired for all users 3 and all vehicles 4. The basis model BM reflects the individualized settings for all users 3 and all vehicles 4. If the comfort model KM is created using just the basis model BM, it can predict individualized settings for any and all users 3 and any and all vehicles 4.

The vehicle model FM is a variation of the basis model BM trained or created with the data 2 acquired for all users 3 of a specific type of vehicle 4. The vehicle model FM indicates the extent the individualized settings for the specific type of vehicle differ from the individualized settings for all other types of vehicles. If the comfort model MK is created by superimposing the vehicle model FM on the basis model BM, the comfort model MK can predict the individualized settings for all users 3 of a specific type of vehicle.

The user model NM is a variation of the basis model BM trained or created with the data 2 acquired for a specific user 3 of all vehicles 4. The user model NM indicates the extent the individualized settings for the specific user 3 differ from the individualized settings for all other users 3. If the comfort model MK is created by superimposing the user model NM on the basis model BM, the comfort model KM can predict the individualized settings for a specific user 3 of all, or any, vehicles 4.

The user/vehicle model NFM is a variation of the basis model BM trained or created with the data 2 acquired for a specific user 3 of a specific type of vehicle. The user/vehicle model NFM indicates the extent the individualized settings for a specific user 3 in a specific type of vehicle differs from the individualized settings for all other users in all other types of vehicles. If the comfort model MK is created by superimposing the user/vehicle model NFM on the basis model BM, the comfort model MK can predict the individualized settings for a specific user 3 of a specific type of vehicle.

The comfort model KM can be created in particular by superimposing all of these sub-models 5 on the basis model MB.

Figure 2:
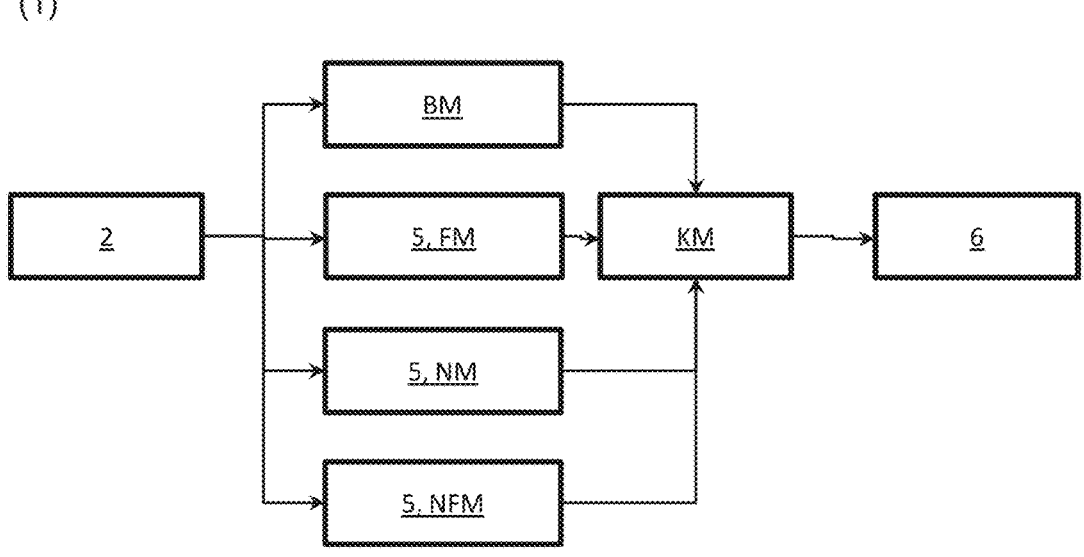
FIG. 2 shows the sequence of the method according to the invention.

FIG. 2 shows part of the sequence of the method 1 according to the invention. The data 2 relating to setting the air conditioner is acquired for all users 3 and all vehicles 4 in the method 1. The basis model BM and sub-models 5—vehicle model FM, user model NM, user/vehicle model NFM—are trained or created using this data 2. The sub-models 5 are subsequently superimposed on the basis model BM to obtain the comfort model KM. Individualized settings 6 for the air conditioner are then predicted for a specific user 3 in a specific vehicle 4 using the comfort model KM.

The specification can be readily understood with reference to the following Representative Paragraphs:

Representative Paragraph 1. A method (1) for individualized setting of an air conditioner in a vehicle (4) for a user (3), wherein, by means of a control architecture:

data relating to setting the air conditioner is acquired for all users (3) and/or all vehicles (4), an average basis model (BM) is trained in an AI unit using the data (2) acquired for all users (3) and all vehicles (4), a comfort model (KM) is created from at least the basis model (BM) in the AI unit, individualized settings (6) for the air conditioner are predicted for a specific user (3) based on the comfort model (KM).

Representative Paragraph 2. The method according to Representative Paragraph 1, characterized in that the average basis model (BM) is obtained with a performance map model.

Representative Paragraph 3. The method according to Representative Paragraph 1 or 2, characterized in that at least one sub-model (5) is also trained in the AI unit and the comfort model (KM) is created by superimposing the at least one sub-model (5) on the comfort model (BM).

Representative Paragraph 4. The method according to Representative Paragraph 3, characterized in that the respective sub-model (5) is a variation of the basis model (BM).

Representative Paragraph 5. The method according to either of the Representative Paragraphs 3 or 4, characterized in that the sub-model (5) is trained by means of the control architecture as a vehicle model (FM), wherein the vehicle model (FM) is a model based on the data (2) acquired for all users (3) of a specific type of vehicle (4).

Representative Paragraph 6. The method according to any of the Representative Paragraphs 3 to 5, characterized in that the sub-model (5) is trained by means of the control architecture as a user model (NM), wherein the user model (NM) is a model based on the data (2) acquired for a specific user (3) of numerous vehicles (4).

Representative Paragraph 7. The method according to any of the Representative Paragraphs 3 to 6, characterized in that the sub-model (5) is trained by means of the control architecture as a user/vehicle model (NFM), wherein the user/vehicle model (NFM) is a model based on the data (2) acquired for a specific user (3) of a specific type of vehicle (4).

Representative Paragraph 8. The method according to at least two of the Representative Paragraphs 5 to 7, characterized in that the vehicle model (FM) and/or user model (NM), and/or user/vehicle model (NFM) differ from one another.

Representative Paragraph 9. The method according to at least two of the Representative Paragraphs 5 to 7, characterized in that the comfort model (KM) is created by superimposing the vehicle model (FM), and/or user model (NM), and/or user/vehicle model (NFM) on the basis model (BM).

Representative Paragraph 10. A control architecture for executing the method (1) according to any of the preceding Representative Paragraphs, wherein the control architecture is designed to:

acquire data (2) relating to setting the air conditioner for all users (3) and all vehicles (4), train an average basis model (BM) based on the data (2) acquired for all users (3) and all vehicles (4) in an AI unit, create a comfort model (KM) from at least the basis model (BM) in the AI unit, predict individualized settings (6) for the air conditioner for a specific user (3) based on the comfort model (KM).

The invention claimed is:

1. A method for individualized setting of an air conditioner in a vehicle for a user, wherein, by means of a control architecture:

data relating to setting the air conditioner is acquired for all users and/or all vehicles, an average basis model is trained in an AI unit using the data acquired for all users and all vehicles, a comfort model is created in the AI unit by:

superimposing a vehicle model of a specific type of vehicle, a user model for a specific user of numerous vehicles, and a user/vehicle model for a specific user of a specific type of vehicle on the average basis model, wherein the vehicle model, user model, and user/vehicle model differ from each other; and controlling an air conditioner for a specific user based on the comfort model and an individualized prediction.

2. The method according to claim 1, wherein the average basis model is obtained with a performance map model.

3. The method according to claim 1, wherein at least one sub-model is also trained in the AI unit and the comfort model is created by superimposing the at least one sub-model on the comfort model.

4. The method according to claim 3, wherein the respective sub-model is a variation of the average basis model.

5. The method according to claim 3, wherein the sub-model is trained by means of the control architecture as a vehicle model, wherein the vehicle model is a model based on the data acquired for all users of a specific type of vehicle.

6. The method according to claim 3, wherein the sub-model is trained by means of the control architecture as a user model, wherein the user model is a model based on the data acquired for a specific user of numerous vehicles.

7. The method according to claim 3, wherein the sub-model is trained by means of the control architecture as a user/vehicle model, wherein the user/vehicle model is a model based on the data acquired for a specific user of a specific type of vehicle.

8. The method according to claim 5, wherein the vehicle model and/or a user model, and/or a user/vehicle model differ from one another.

9. The method according to claim 5, wherein the comfort model is created by superimposing the vehicle model, and/or a user model, and/or a user/vehicle model on the average basis model.

10. A control architecture for executing the method according to claim 1, wherein the control architecture is designed to:

acquire data relating to setting the air conditioner for all users and all vehicles, train an average basis model based on the data acquired for all users and all vehicles in an AI unit, create a comfort model from at least the average basis model in the AI unit, predict individualized settings for the air conditioner for a specific user based on the comfort model.

\* \* \* \* \*